(12) United States Patent
Johansson (10) Patent No.: US 9,933,803 B2
(45) Date of Patent: Apr. 3, 2018

(54) SYSTEM AND METHOD FOR DISTRIBUTING POWER TO ELECTRICAL VEHICLES

(71) Applicant: LIROS POWER SOLUTION AB, Malmo (SE)

(72) Inventor: Roland Johansson, Vittsjo (SE)

(73) Assignee: LIROS POWER SOLUTION AB, Malmo (SE)

( * ) Notice: Subject to any disclaimer, the term of this patent is extended or adjusted under 35 U.S.C. 154(b) by 172 days.

(21) Appl. No.: 14/443,582

(22) PCT Filed: Nov. 18, 2013

(86) PCT No.: PCT/SE2013/051348
§ 371 (c)(1),
(2) Date: May 18, 2015

(87) PCT Pub. No.: WO2014/077774
PCT Pub. Date: May 22, 2014

(65) Prior Publication Data
US 2015/0301547 A1    Oct. 22, 2015

(30) Foreign Application Priority Data

Nov. 19, 2012 (SE) ...................................... 1251307
Dec. 18, 2012 (SE) ...................................... 1251451
May 30, 2013 (SE) ...................................... 1350657

(51) Int. Cl.
*G06F 19/00* (2011.01)
*G05F 1/66* (2006.01)
(Continued)

(52) U.S. Cl.
CPC ............ *G05F 1/66* (2013.01); *B60L 11/1816* (2013.01); *B60L 11/1825* (2013.01);
(Continued)

(58) Field of Classification Search
CPC combination set(s) only.
See application file for complete search history.

(56) References Cited

U.S. PATENT DOCUMENTS 7,984,852 B2    7/2011  Outwater
8,315,930 B2 *  11/2012 Littrell ................ B60L 11/1824
                                                320/109
(Continued)

FOREIGN PATENT DOCUMENTS

CN    102340149 A    2/2012
CN    102458909 A    5/2012
(Continued)

OTHER PUBLICATIONS

International Search Report; International application No. PCT/SE2013/051347; Date of the actual completion of the international search: Mar. 18, 2014.
(Continued)

*Primary Examiner* — Kidest Bahta
(74) *Attorney, Agent, or Firm* — Mollborn Patents, Inc.; Fredrik Mollborn (57) ABSTRACT

The present invention relates to a cloud server adapted for controlling a group of one or more electric distribution appliances, where each electric distribution appliance of said group is adapted for distributing electric power from a mains power source to a mobile device such as an electric vehicle. The invention also relates to a system for distributing power from a mains power source to one or more mobile devices, such as electric vehicles, said system comprising a) a group consisting of one or more electric distribution appliances; and b) a cloud server. Finally, the invention provides a method for distributing power in said system.

18 Claims, 3 Drawing Sheets

(51) Int. Cl.
  *B60L 11/18* (2006.01)
  *H02J 7/00* (2006.01)
  *H04L 29/08* (2006.01)
  *H04W 84/04* (2009.01)
  *H04W 84/12* (2009.01)

(52) U.S. Cl.
  CPC ....... *B60L 11/1844* (2013.01); *B60L 11/1846* (2013.01); *B60L 11/1848* (2013.01); *H02J 7/0047* (2013.01); *H04L 67/1002* (2013.01); *H04L 67/12* (2013.01); *B60L 2230/12* (2013.01); *B60L 2230/16* (2013.01); *B60L 2240/70* (2013.01); *B60L 2240/72* (2013.01); *B60L 2250/12* (2013.01); *H02J 2007/0096* (2013.01); *H04W 84/045* (2013.01); *H04W 84/12* (2013.01); *Y02T 10/7005* (2013.01); *Y02T 10/7088* (2013.01); *Y02T 10/7291* (2013.01); *Y02T 90/121* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 30/14* (2013.01)

(56) References Cited

U.S. PATENT DOCUMENTS

| | | | |
|---|---|---|---|
| 9,123,035 B2* | 9/2015 | Penilla | G06Q 20/18 |
| 9,545,853 B1* | 1/2017 | Penilla | B60L 11/1824 |
| 2002/0158749 A1 | 10/2002 | Ikeda et al. | |
| 2009/0174365 A1 | 7/2009 | Lowenthal et al. | |
| 2010/0013434 A1 | 1/2010 | Taylor-Haw et al. | |
| 2010/0013436 A1 | 1/2010 | Lowenthal et al. | |
| 2010/0283426 A1 | 11/2010 | Redmann | |
| 2011/0077809 A1* | 3/2011 | Leary | B60L 11/1824 701/22 |
| 2011/0172839 A1* | 7/2011 | Brown | B60L 3/0069 700/292 |
| 2011/0246014 A1 | 10/2011 | Sauper | |
| 2013/0179007 A1* | 7/2013 | Dalum | H01M 16/006 701/2 |
| 2013/0268433 A1 | 10/2013 | Viner et al. | |
| 2014/0039699 A1* | 2/2014 | Forbes, Jr. | G05B 19/02 700/286 |
| 2014/0152256 A1* | 6/2014 | Lowenthal | B60L 11/1816 320/109 |
| 2014/0371936 A1* | 12/2014 | Kamel | G01R 21/1333 700/291 |

FOREIGN PATENT DOCUMENTS

| | | |
|---|---|---|
| DE | 102007038245 A1 | 3/2009 |
| DE | 102009008157 A1 | 8/2010 |
| WO | 2011117541 A3 | 3/2012 |
| WO | 2012034225 A1 | 3/2012 |
| WO | 2013034872 A2 | 3/2013 |

OTHER PUBLICATIONS

International Search Report; International application No. PCT/SE2013/051348; Date of the actual completion of the international search: Mar. 19, 2014.

* cited by examiner

Fig. 2

SYSTEM AND METHOD FOR DISTRIBUTING POWER TO ELECTRICAL VEHICLES

FIELD OF INVENTION

The present invention relates to the field of distributing power. More specifically, the invention relates to a cloud server adapted for controlling a specific set of electric distribution appliances. The invention also provides a system for distributing power comprising a plurality of electric distribution appliances and a cloud server, where said cloud server is adapted for controlling the electric distribution appliances. Finally, the invention provides a method for controlling said system.

TECHNICAL BACKGROUND

There is an increase demand of infrastructure solutions for charging electric vehicles. However, most such solutions aim at setting up new charging stations demanding new connections to the mains. Examples of such solutions could be found in DE 10 2007 038 245, U.S. Pat. Nos. 5,563,491 and 7,984,852. WO 2011/042322 and US 2011/0213656 both relate to new such charging stations in combination with management of parking spaces. Such systems are expensive and complicated because of the extensive construction work that is required but also because of construction permits required in most countries. Accordingly, there is a need for cheap, simple and flexible solutions regarding infrastructure for electric vehicles.

SUMMARY OF THE INVENTION

The invention solves the above mentioned problems by providing a cloud server, a system for distributing power, and a method for distributing power in accordance with the appended claims.

In a first aspect, the invention provides a cloud server adapted for controlling a group of one or more electric distribution appliances,
  each electric distribution appliance of said group being adapted for distributing electric power from a mains power source to a mobile device such as an electric vehicle, each electric distribution appliance of said group having a controller, a communication unit adapted for communication with a cloud server, a user interface section and a switching means, said user interface section being adapted for generating a distribution request after receiving input from a user and adapted for forwarding said distribution request to said controller, said controller being adapted to transfer said distribution request to said communication unit, said communication unit being adapted for transferring said distribution request to a cloud server and to receive a distribution decision from said cloud server and to forward said distribution decision to said controller, said controller being adapted to control the distribution of power carried out by said switching means based on information transferred from said user interface section and said distribution decision forwarded from said communication unit;
said cloud server comprising
  a processor;
  a memory means adapted for storing one or more rules regarding distribution of electricity in an electric distribution appliance of the group of one or more electric distribution appliances; and
  a master communication unit being adapted for communication with each electric distribution appliance of a group of one or more electric distribution appliances;
  said master communication unit being set up to receive a distribution request from an electric distribution appliance of the group of one or more electric distribution appliances and to forward the distribution request to said processor;
  said processor being set up to receive a distribution request from said master communication unit;
  said processor being set up to access one or more rules stored in said memory means;
  said processor being set up to prepare a distribution decision based upon said distribution request using said one or more rules;
  said processor being set up to instruct said master communication unit to forward said distribution decision to said electrical distribution appliance of the group of one or more electrical distribution appliances.

In a second aspect, the invention provides a system for distributing power from a mains power source to one or more mobile devices, such as electric vehicles, said system comprising a) a group consisting of one or more electric distribution appliances; and b) a cloud server in accordance with the first aspect, wherein
  each electric distribution appliance of said group being adapted for distributing electric power from a mains power source to a mobile device such as an electric vehicle, each electric distribution appliance of said group having a controller, a communication unit adapted for wireless communication with said cloud server, a user interface section and a switching means, said user interface section being adapted for generating a distribution request after receiving input from a user and adapted for forwarding said distribution request to said controller, said controller being adapted to transfer information relating to a distribution request to said communication unit, said communication unit being adapted for transferring said information relating to a distribution request to a cloud server and to receive a distribution decision from said cloud server and to forward said distribution decision to said controller, said controller being adapted to control the distribution of power carried out by said switching means based on information transferred from said user interface section and said decision information forwarded from said communication unit.

In a third aspect, the invention provides a method for distributing power, said method being implemented in a system in accordance with claim 10, said system comprising a cloud server and a group of one or more electric distribution appliances, the method comprising the steps of:
  d) generating a distribution decision in the processor of the cloud server taking the rules stored in the memory means of the cloud server into account, said distribution decision relating to a specific distribution of power in a specific electric distribution appliance of the group of electric distribution appliances;
  e) transferring the distribution decision generated in step d) via the master communication unit of the cloud server and the communication unit of the specific electric distribution appliance to the controller of the specific electric distribution appliance; and
  f) generating, in the controller of the specific electric distribution appliance, control signals in accordance with the distribution decision transferred in step e), and forwarding said control signals to the switching means of the specific electric distribution appliance, thereby implementing the distribution decision.

DETAILED DESCRIPTION OF THE INVENTION

In a first aspect, the invention provides a cloud server adapted for controlling a group of one or more electric distribution appliances,
  each electric distribution appliance of said group being adapted for distributing electric power from a mains power source to a mobile device such as an electric vehicle, each electric distribution appliance of said group having a controller, a communication unit adapted for communication with a cloud server, a user interface section and a switching means, said user interface section being adapted for generating a distribution request after receiving input from a user and adapted for forwarding said distribution request to said controller, said controller being adapted to transfer said distribution request to said communication unit, said communication unit being adapted for transferring said distribution request to a cloud server and to receive a distribution decision from said cloud server and to forward said distribution decision to said controller, said controller being adapted to control the distribution of power carried out by said switching means based on information transferred from said user interface section and said distribution decision forwarded from said communication unit;
said cloud server comprising
  a processor;
  a memory means adapted for storing one or more rules regarding distribution of electricity in an electric distribution appliance of the group of one or more electric distribution appliances; and
  a master communication unit being adapted for wireless communication with each electric distribution appliance of a group of one or more electric distribution appliances;
  said master communication unit being set up to receive a distribution request from an electric distribution appliance of the group of one or more electric distribution appliances and to forward the distribution request to said processor;
  said processor being set up to receive a distribution request from said master communication unit;
  said processor being set up to access one or more rules stored in said memory means;
  said processor being set up to prepare a distribution decision based upon said distribution request using said one or more rules;
  said processor being set up to instruct said master communication unit to forward said distribution decision to said electrical distribution appliance of the group of one or more electrical distribution appliances.

Accordingly, the term "cloud server" relates to a server or a computer which is connected to an external network such as the internet, which cloud server controls and coordinates a group of electric distribution appliances based, among all, on incoming data from the individual electric distribution appliances and rules stored in a memory means of the cloud server.

As disclosed herein, the term "mobile device" relates to any type of device that is movable and could be powered by a power supply mains. Examples of such devices are electric vehicles, such as electric cars, segways, and electric motorcycles, but also other portable machines and portable lighting sets. A further example is a conventional car equipped with an electrically powered engine pre-heater or a car heater.

As disclosed herein, the term "controller" relates to a micro-computer or a similar device for receiving data, transforming data according to standard routines and sending out data. The controller is installed in an electric distribution appliance. Typically, the controller receives data from the cloud server via the communication unit or from the user interface section of the electric distribution appliance. In some embodiments, the controller may also receive data from optional parts of the electric distribution appliance, such as from a payment section, an RFID reader, a Bluetooth interface, one or more power sensors and the communication unit. The data is processed according to pre-defined rules and the processed data is typically sent out to at least one member of the group of the switching means, the communication unit, an optional means for displaying visual signals, the user interface section and an optional payment section. The skilled person should be able to select a suitable controller.

As disclosed herein, the term "communication unit" relates to a combined transmitter and receiver (a "transceiver") adapted for transmitting and receiving data signals to and from the master communication unit of the cloud server. Typically, the communication unit is in contact with the master communication unit over a mobile phone network or WiFi network which is connected to an external network such as the internet to which the master communication unit also is connected. In some embodiments, the communication unit is also adapted for transmitting and receiving signals to and from a mobile phone or mobile computer using mobile phone technology. In these embodiments, the communication unit is also adapted for forwarding signals received from such a mobile phone or a mobile computer to an external network such as the internet. In the present context, the specific master communication unit is located in the cloud server. In some embodiments a master appliance could be used for forwarding signals back and forth between the external network such as the internet and individual electric distribution appliances, typically by using mobile phone technology.

As disclosed herein, the term "user interface section" relates to a part of the electric distribution appliance that comprises means, typically RFID reading means or a Bluetooth interface, but in some embodiments buttons and keys, by which a user may submit instructions to the electric distribution appliance. In some embodiments, the interface section does not have any such buttons or keys but only RFID reading means and/or a Bluetooth interface. Typical examples of such instructions are "initiate distribution of power to the mobile device" and "interrupt distribution of power to the mobile device". Typically, a first presentation of an RFID tag may be interpreted as an instruction to initiate distribution of power to the mobile device and a second subsequent presen In some embodiments, the user may submit other instructions and data, such as requested amount of time for distribution of power to the mobile device, and the amount of electrical power to be distributed. In some embodiments, the user may identify himself/herself at the interface section by entering a pin code. In other embodiments, the user may identify himself/herself elsewhere, for instance by presenting a credit card, an RFID tag or an e-wallet where the user is identified by a Bluetooth interface. Even when the user identifies himself/herself outside the interface section, in some embodiments the user initiates and/or terminates distribution of power by submissions using the interface section.

As disclosed herein, the term "distribution request" relates to a data package generated at the interface section when a user has entered a command regarding distribution of power to a mobile device. A distribution request may relate to a) initiating a new distribution of power to a mobile device at a specific electric distribution appliance; b) to adjust or amend an on-going distribution event (such as changing output power); and to c) terminate an on-going distribution event. Typically, a distribution request data package may comprise data identifying the user and a particular electric distribution appliance. In some embodiments, the data package may also contain a maximum output power value, and or a requested amount of time for the distribution.

As disclosed herein, the term "distribution decision" relates to a data package generated by the processor of the master appliance in response to a distribution request. Data and rules stored in the memory means of the master appliance are considered when generating the distribution decision. Typically, a distribution decision data package comprises information about in which electric distribution appliance power is to be distributed and in the power is to be distributed to an outgoing cable (typically to a lamp of a lamp post) or to a connection to a mobile device.

As disclosed herein, the term "switching means" relates to an arrangement located in an electrical distribution appliance which is intended for switching electrical power from an incoming cable connected to a power mains to a cable connection that is adapted for being connected to a mobile device, and/or to an outgoing cable typically leading to a lamp of a lamp post. Preferably, the switching means is capable of fine-tuning the distribution of power to both the cable connection and to the outgoing cable. The distribution operations of the switching means are carried out after reception of control signals, typically from the controller, which in turn are generated in response to a distribution decision.

As disclosed herein, the term "processor" relates to the operating part of a computer where all calculations are carried out. The skilled person should be able to choose a suitable processor for carrying out the calculations of the cloud server.

As disclosed herein, the term "memory means" relates to a computer memory device suitable for storage of data. The skilled person should be able to find a suitable memory device for storing all data required for running the cloud server.

In some embodiments, said processor is adapted for preparing a distribution decision in absence of a distribution request and in accordance with said one or more rules.

In some embodiments, the processor is adapted to save distribution requests relating to on-going distributions in said memory means and to delete distribution requests relating to terminated distributions from said memory means.

In some embodiments, said master communication unit is adapted for communication with an external network, such as the Internet. In some embodiments, said master communication unit is adapted for communication with the Internet using mobile phone technology, such as GSM, 3G or 4G.

In some embodiments said master communication unit is set up to receive information packages from each member of said group of electric distribution appliances, and said processor is set up to forward such information packages to one or more specific addresses in said external network.

In some embodiments, said information packages that are received from each member of said group of electric distribution appliances and that are being forwarded to one or more specific addresses in said external network relate to invoicing information or status reports. Typically, such status report relate to the status of a particular electric distribution appliance.

In some embodiments, said master communication unit is adapted for receiving information packages relating to updates of said rules from said external network, and said master communication unit is furthermore adapted for forwarding the information packages relating to updates of said rules to said processor, and finally said processor is adapted to updating the rules stored in said memory means based on said information packages relating to updates of said rules.

In some embodiments, said master communication unit is adapted for communicating with electric distribution appliances of said group of one or more electric distribution appliances via a master appliance connected to said external network which master appliance in turn is adapted for communicating with said electric distribution appliances using WiFi technology.

In a second aspect, the invention provides a system for distributing power from a power mains to one or more mobile devices, such as electric vehicles, said system comprising a) a group consisting of one or more electric distribution appliances; and b) a cloud server in accordance with the first aspect, wherein each electric distribution appliance of said group being adapted for distributing electric power from a power mains to a mobile device such as an electric vehicle, each electric distribution appliance of said group having a controller, a communication unit adapted for wireless communication with said cloud server, a user interface section and a switching means, said user interface section being adapted for generating a distribution request after receiving input from a user and adapted for forwarding said distribution request to said controller, said controller being adapted to transfer information relating to a distribution request to said communication unit, said communication unit being adapted for transferring said information relating to a distribution request to a cloud server and to receive a distribution decision from said cloud server and to forward said distribution decision to said controller, said controller being adapted to control the distribution of power carried out by said switching means based on information transferred from said user interface section and said decision information forwarded from said communication unit.

In a third aspect, the invention provides a method for distributing power, said method being implemented in a system in accordance with the second aspect of the invention, said system comprising a cloud server and a group of one or more electric distribution appliances, the method comprising the steps of:

d) generating a distribution decision in the processor of the cloud server taking the rules stored in the memory means of the cloud server into account, said distribution decision relating to a specific distribution of power in a specific electric distribution appliance of the group of electric distribution appliances;

e) transferring the distribution decision generated in step d) via the master communication unit of the cloud server and the communication unit of the specific electric distribution appliance to the controller of the specific electric distribution appliance; and f) generating, in the controller of the specific electric distribution appliance, control signals in accordance with the distribution decision transferred in step e), and forwarding said control signals to the switching means of the specific electric distribution appliance, thereby implementing the distribution decision.

In some embodiments of the third aspect, the invention provides a method for distributing power to one or more mobile devices, such as an electric vehicle, said method being in accordance with the more general method disclosed above and where the following steps are carried out before step d) of said more general method:

a) receiving input from a user at a user interface section of a specific electric distribution appliance of the group of one or more electric distribution appliances regarding distribution of power to a mobile device from the specific electric distribution appliance;

b) generating a distribution request based upon the input received in step a);

c) transferring the distribution request generated in step b) via the controller and communication unit of the specific electric distribution appliance and the master communication unit of the cloud server to the processor of the cloud server;

In some embodiments of both the general and the more specific methods disclosed above, the distribution decision generated in step d) may relate to initiation, adjustment or termination of a power distribution event.

The following is applicable in some embodiments of both the general and the more specific methods disclosed above:

i) distribution decisions relating to on-going power distribution events are stored in said memory means;

ii) distribution decisions relating to terminated power distribution events are deleted from said memory means; and iii) distribution decisions stored in said memory means as well as said rules stored in said memory means are considered when generating new distribution decisions.

In some embodiments of both the general and the more specific methods disclosed above, invoicing data is forwarded from a specific electrical distribution appliance via the cloud server to a specific address in said external network when a power distribution event at that specific electrical distribution appliance has been terminated.

In preferred embodiments of both the general and the more specific methods disclosed above, said input received in step a) of the method is at least one action selected from the group of:

1) presenting an RFID tag before an RFID reading means of the interface section of an electrical distribution appliance, said presenting generating an input regarding distribution of power to a mobile device from the specific electric distribution appliance;

2) presenting a Bluetooth device before a Bluetooth means of the interface section of an electrical distribution appliance said presenting generating an input regarding distribution of power to a mobile device from the specific electric distribution appliance; and 3) calling up or sending an SMS text message to a specific phone number over a mobile phone network from a mobile appliance containing a SIM card registered by said system, said calling or sending resulting in transmission of a signal to said system from said mobile network, which generates an input regarding distribution of power to a mobile device from the specific electric distribution appliance.

As disclosed herein, the term "mobile appliance" relates to any mobile appliance adapted for containing and making use of a SIM card. Examples of such mobile appliances are mobile telephones, tablets, portable computers, ipads, etc.

In preferred embodiments of both the general and the more specific methods disclosed above, said input is selected from the group of:

an instruction to initiate distribution of electrical power; and an instruction to terminate distribution of electrical power.

Typically, a first input is regarded as an instruction to initiate distribution of electrical power and a subsequent second input is regarded as an instruction to terminate distribution of electrical power.

DESCRIPTION OF THE ENCLOSED FIGURES

The invention will now be further disclosed with reference to the enclosed figures, in which.

Figure 1:
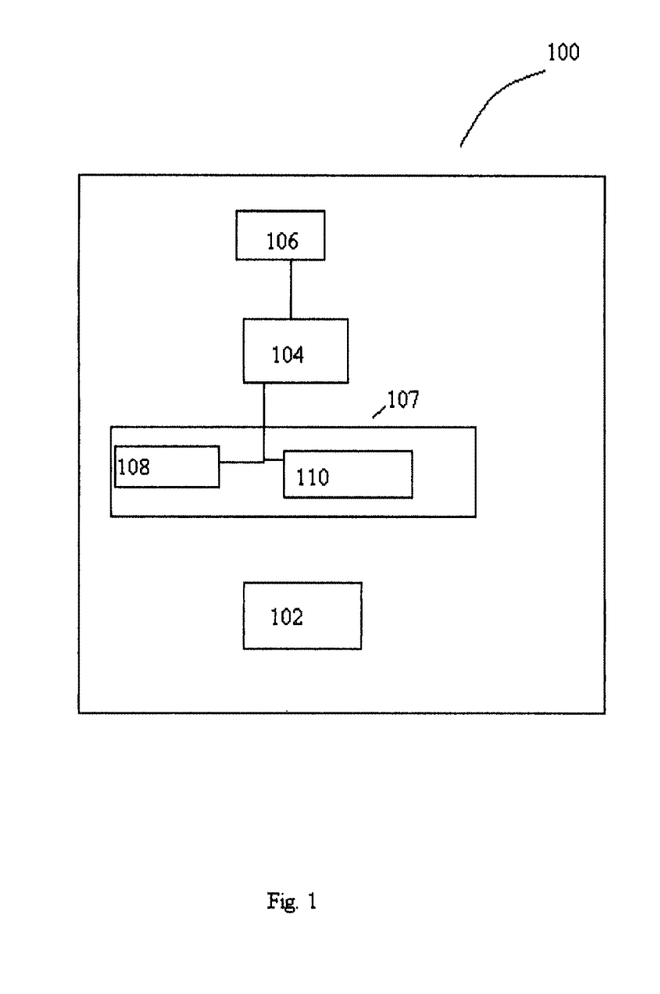
FIG. 1 provides a brief outline of a master appliance in accordance with the present invention.

Starting with FIG. 1, the general outline of a cloud server 100 is disclosed. The cloud server 100 is powered by a power source 102. The core part of the cloud server 100 is the processor 104 carrying out all calculations. The processor 104 is supported by a memory means 107, which typically can be divided into two subunits, namely a decision memory unit 108 and a rules memory unit 110. The decision memory unit 108 is intended for storing pending distribution decision in order to render it possible for the cloud server 100 to monitor distribution of power in the group 142 of electric distribution appliances 130, 134, 138 controlled by the cloud server 100. The rules memory unit 110 is intended for storing rules relating to how power should be distributed by individual electric distribution appliances 130, 134, 138 within said group 142 of electric distribution appliances. These rules may specify the maximum amount of power that could be distributed by a particular electric distribution appliance under given circumstances. The rules may also specify whether a particular user is considered having priority in relation to another user. Furthermore, the rules may specify the maximum amount of time a particular distribution event may last before interruption. The cloud server 100 also comprises a master communication unit 106. The master communication unit 106 is adapted for communication with each and every electric distribution appliance 130, 134, 138 of said group 142 of electric distribution appliances. Typically, the master communication unit 106 communicates with each such electric distribution appliance using an external network such as the internet (120), mobile phone technology such as GSM, 3G or 4G and/or WiFi technology. The master communication unit 106 is adapted for accessing and be accessed from internet (120), and be accessed from internet (120), for instance regarding rules updates. In some embodiments, the master communication unit 106 is adapted for forwarding data signals from each electric distribution appliance to other addresses of an external network. In some embodiments, such data signals relate to status reports or invoicing information from a particular electric distribution appliance 130, 134, 138. The invoicing information typically originates from power sensor(s) of a switching means 166 or a credit card reader of the interface section.

Figure 2:
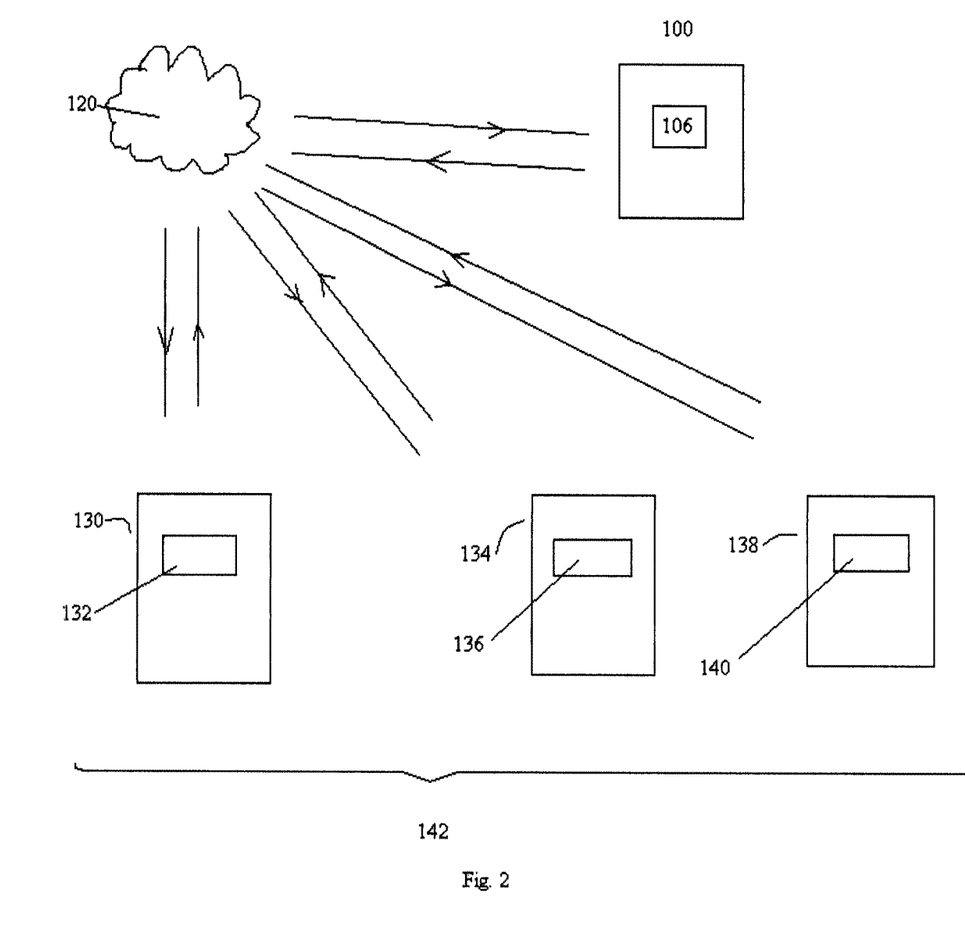
FIG. 2 shows an overview of a system in accordance with the present invention.

FIG. 2 presents an overview of a system 150 according to the present invention where a cloud server 100 controls a group 142 of electric distribution appliances 130, 134, 138. Signals are transmitted and received by the master communication unit 106 of the master appliance and communication units 132, 136, 140 of each electric distribution appliance 130, 134, 138, of the group 142. Typically, the signals are transmitted and received using an external network such as the internet (120), a mobile phone network such as GSM, 3G and 4G or by WiFi technology.

In some embodiments, it may be difficult for individual electric distribution appliances to access a mobile phone network, such as GSM, 3G and 4G directly. In such a situation a master appliance (not shown) could be used as a means for forwarding signals between a mobile phone network (connected to the internet 120) and such individual electric distribution appliances. Typically, the master appliance is arranged in vicinity of a group 142 of electric distribution appliances 130, 134, 138. The master appliance may be arranged on an existing structure having an electric connection, such as an existing lamp post. It may also be arranged in other suitable ways. The master appliance is powered by a power source. Preferably, the power source is a power mains but it could also, in principle, be a battery optionally together with a solar cell unit. It is advantageous to arrange the master appliance in an elevated and/or exposed location in order to optimize quality of signal transmitted and received.

Figure 3:
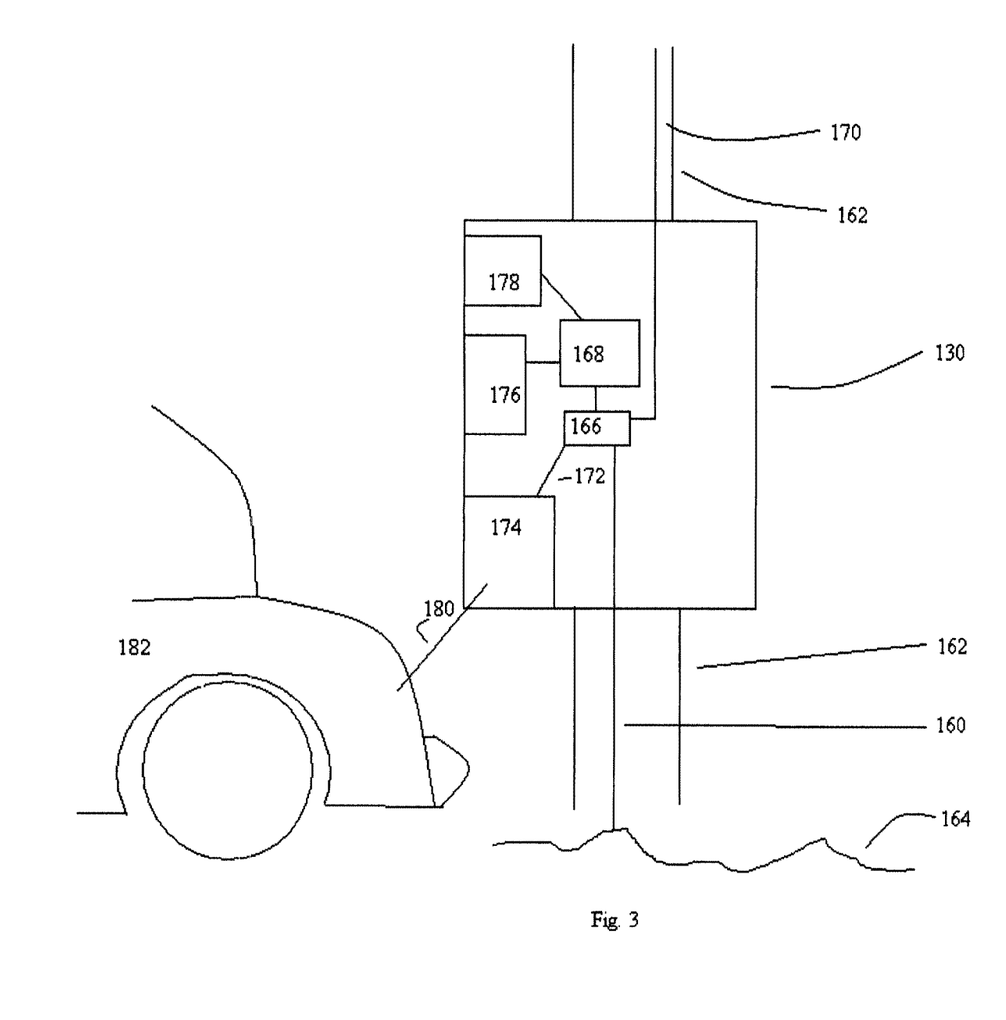
FIG. 3 discloses a simplified view of an electric distribution appliance which constitutes an important part of the system of the present invention.

FIG. 3 discloses a simplified view of an electric distribution appliance 130 that constitutes a part of the system 150 of the present invention. Typically, the electric distribution appliance is mounted on a support means 162, such as an existing lamp post. The advantage of mounting the electric distribution appliance 130 on an existing lamp post is that the lamp post is already connected to a power mains and that no additional connecting cables are needed. Accordingly, the support means or lamp post comprises an incoming cable 160 that is connected to the power means 164. The incoming cable is also connected to a switching means 166. The switching means 166 is also connected to a cable connection 172 connecting the contact module 174, which in turn is adapted for being connected to a mobile device 182 via an additional cable 180. Finally, and especially in case the support means 162 is a lamp post, the switching means may also be connected to an outgoing cable 170 leading to a lightening means or a lamp. The switching means is adapted for turning on or turning off the power to the outgoing cable 170. The switching means 166 is also adapted for turning on or turning off the power to the cable connection 172. The switching means may in some embodiments comprise one or more power sensors (not shown) adapted for sensing the power distributed to cable connection 172 and/or outgoing cable 170. The switching means 166 is controlled by controller 168. Accordingly, there are connections in both directions between the switching means 166 and the controller 168. The controller 168 typically sends control signals to the switching means 166 regarding how much power that is to be distributed to the cable connection 172 and/or the outgoing cable 170. The optional power sensor(s) measure the power that is distributed to the cable connection 172 and/or the outgoing cable 170 and forward(s) this information to the controller 168.

The controller is also connected to an interface section 176 and a communication unit 178. The interface section 176 typically comprises means (not shown) for initiating and terminating charging of a mobile device. The interface section may in some embodiments also comprise a payment section (not shown). Such a payment section may comprise means for identifying a user and/or obtaining payment from a user such as a credit card reader and an interface relating to such a reader, as well as a means for detecting an RFID tag or a Bluetooth reading means. Accordingly, the user may identify himself by presenting a credit card, RFID tag or by a Bluetooth connection. In case the user has an account connected to a system according to the invention, the cost for the power to be distributed could be charged to that account. Alternatively, the cost could be charged to the credit card. The payment section and the functionality associated with payments may be located in a defined area together with the interface section 176 but the components of the interface section 176 may also be arranged elsewhere on the electric distribution appliance 130 as long as they can be accessed and used by a user.

In a preferred embodiment of the invention, the electrical distribution appliance 130 does not have any outer actuation means such as keys, buttons or credit card readers. One advantage of such an arrangement is that the appliance is more protected against vandalism. Another consequence of the arrangement is that the interaction between a user and an electrical distribution appliance 130 of a particular system 150 for distributing power from a power mains must be simplified. Typically, only two different commands are needed, namely to initiate distribution of power and to terminate distribution of power. Furthermore, the actual signals sent by a user to the system 150 may be the same. Accordingly, in some embodiments the particular signals of a flow of signals from a particular user are grouped in pairs of two consecutive identical signals. The first signal of a particular pair is then interpreted as a command to initiate distribution and the subsequent and virtually identical signal is interpreted as a command to terminate distribution. Both these commands initiate generation of distribution requests and user identification data which will be discussed in more detail below. These signals may typically be generated in the interface section 176 by presentation of an RFID tag before an RFID reading means, by presentation of Bluetooth device before a Bluetooth means but also by calling up or sending an SMS text message to a specific phone number over a mobile phone network from a mobile appliance (mobile phone, tablet, portable computer) containing a SIM card registered by said system 150, said calling or sending resulting in transmission of a signal to said system 150 from said mobile network, which generates an input regarding distribution of power to a mobile device 182) from the specific electric distribution appliance 130. In some embodiments it is necessary to carry out at least two these actions (RFID, Bluetooth, phone call or SMS) in order to generate a signal.

The components of the interface section 176 generate data. Typical examples of data generated in the interface section 176 are distribution requests and user identification data. As mentioned above, such data (distribution requests and user identification data) can also be generated from data obtained from a mobile telephone network and which data has been generated by a mobile appliance. In this case, a distribution request may be generated in the cloud server when data from the mobile telephone network has been received. Alternatively, a distribution request is generated when an identified user attempts to initiate distribution of power at a particular electric distribution appliance. Typically, such a distribution request comprises data identifying a specific electric distribution appliance 130 and at least one specific distribution channel within the electric distribution appliance 130 such as the outgoing cable 170 and/or the cable connection 172. Typically, the distribution request indicates initiation or termination of distribution of power. The distribution request may also comprise data requesting distribution of a specific amount of power, time data specifying when power is to be distributed and data specifying how the power should or could be changed over time. Examples of data identifying a user are data obtained from a credit card reader, a Bluetooth reading means, a SIM card relating to a particular subscription or an RFID tag reading means. The above mentioned data from the interface section 176 is forwarded to the controller 168 and subsequently further forwarded to the communication unit 178 and transmitted to the cloud server 100. SIM card data is typically forwarded to the master appliance from a mobile telephone network. Invoicing data from any credit card reader is forwarded to the communication unit and further to an associated network 120 via the master communication unit 106 of the master appliance.

The communication unit 178 is typically a wireless communication device comprising a receiver and transmitter for receiving and transmitting information and commands. In one embodiment, the communication unit 178 is set up to exclusively communicate with a master communication unit 106 in a cloud server 100. In one embodiment, the communication unit 178 is also adapted for wireless communication with an LED arrangement. Examples of information and commands that could be transmitted/received by the communication unit 178 is invoice information originating from one or more power sensors in the switching means 166, user identification information originating from interface section 176, distribution requests originating from interface section 176, distribution decisions originating from the cloud server 100, and status reports relating to the electric distribution appliance and connected mobile devices and equipment such as lamps, LED arrangements, and other types of light-producing means. The status reports may originate from the controller 168 of the electric distribution appliance 130. In some embodiments, status reports may also be generated by other parts of the electric distribution appliance 130 or by mobile devices 182 and equipment connected to the electric distribution appliance 130. Accordingly, in such embodiments status reports could be generated by connected LED arrangements or by parts of the interface section 176.

In one embodiment, the communication unit 178 further comprises a small femtocell base station for providing mobile phone services and/or a Wi-Fi hot spot area within 10 m from the electrical distribution appliance 130. In this embodiment, the data traffic to and from the small femtocell base station is guided via the master communication unit 106 of the master appliance 100. In one embodiment, the communication unit 178 may be connected to a separate antenna (not shown). In one embodiment, the antenna is located close to the communication unit. In this embodiment, the antenna is typically of a type used in mobile phones and may protrude through the outer covering of the electric distribution appliance although it may also be fully enclosed. In another embodiment and in case the electric distribution appliance is mounted on a lamp post or a similar tall object, the antenna may be mounted on or in said lamp post at a distance from the communication unit.

The present application also relates to a method for distributing power in a system as describe above in FIG. 2 together with FIGS. 1 and 3. The core steps of the method are "generation of a distribution request" and "generation of a distribution decision". These core steps together with the complete method will be discussed in the following.

The basic idea behind the subject matter of the present application is to use the existing infrastructure regarding street lighting in order to provide charging service for electric vehicles. As the basic infrastructure is already present in most places, it should be comparatively cheap to supplement the street lighting infrastructure in order to obtain a suitable charging infrastructure. Furthermore, the ongoing substitution of LED arrangements for conventional light bulbs also results in reduced energy consumption for lighting as well as increased availability of energy for other purposes, such as charging.

However, it is also important to keep in mind that the existing infrastructure is dimensioned for a certain maximum load. Problems may occur if that load is exceeded. The load as well as available load up to said maximum load of the infrastructure (or network mains) in the vicinity of a certain group 142 of at least one electric distribution appliance 130, 134, 138 also varies with time. For example the available load is typically larger at daytime (when street lighting is turned off) compared to the available load at nighttime (when street lighting is tuned on). If power is being distributed to a mobile device 182 at one electric distribution appliance 130 of a group 142 of closely located electric distribution appliances, the available load is reduced. Accordingly, the available load that can be distributed to a given mobile device 182 from a certain electric distribution appliance 130 of a group 142 of electric distribution appliances at a given moment is dependent of the actual load on the mains network in vicinity of the group 142 of electric distribution appliances at that given moment. Therefore, it is important to control and/or monitor distribution of power from each member 130, 134, 138 of a group 142 of electric distribution appliances. In view of what is stated above, it may therefore also not always be possible grant all distribution requests and it may also be necessary to allow the distributed power to vary with time.

In view of the fact that the amount of power that is available for distribution is restricted, it is important to establish a set of rules resulting in good service for customers, safe distribution of power and reasonable considerations regarding power needed for street lighting during the time that is needed. In addition to rules in accordance with the reasoning in the preceding paragraph about power available for distribution to a mobile device 182, such rules may define different priority levels for different users. A user may, for instance, get a higher priority at all or some specific electric distribution appliances. Some rules may render it possible for at least some users to book distribution at a specific electric distribution appliance in advance. Some rules may render it possible for one or more users to specify a specific charging time, a specific scheme for dynamic distribution of power where the distributed power level changes with time in accordance with the scheme. Some rules may specify when street lighting should be turned on and/or off, and accordingly, when the associated changes in available power for distribution to mobile devices should apply. Some rules may also specify what should happen in case of an accidental partial power failure. Some rules may specify what happens when there is an insufficient amount of available power. Such rules may prescribe that all users get some (although insufficient) power and/or that some users do not receive any power at all. The rules are stored in the memory means 107 of the master appliance and may be updated by communication with an external network 120.

The method of distributing power in accordance with the present application is often initiated when the system 150 receives input from a user at a user interface section 176 of a specific distribution appliance 130. In one embodiment, the user identifies himself by Bluetooth communication, presenting an RFID tag of some kind, calling or sending an SMS to a specific phone number or by presenting a credit card. The user then typically requests distribution of power to a mobile device connected to the specific electric distribution appliance 130. A distribution request is then generated by the data obtained in the interface section and the distribution request is forwarded to a cloud server 100 set up to control and coordinate the group 142 of electric distribution appliances to which the specific electric distribution appliance 130 belongs. The processor 104 of the master appliance then receives the distribution request and generates a distribution decision based on, among all, the request, distribution decisions relating to pending distributions and one or more rules stored in the memory means. Such a distribution decision may or may not state that the requested distribution is granted. The distribution decision may also result in cancellation of one or more pending distributions of power. The distribution decision is transmitted to affected electric distribution appliances within the group 142. The controllers 168 of the affected electric distribution appliances generate appropriate control signal and forward these signals to the switching means 166 of each electric distribution appliance.

A distribution decision may also be generated even though no user has initiated any new distribution. For instance, when street lighting is turned on or turned off, the power available for distribution will be reduced and it will be necessary to adjust the amount of power that is distributed. Similarly, when a user request cancellation of distribution and the amount of available power increases, other distributions may, in accordance with the rules, be adjusted and new distribution decisions are issued.

In some embodiments, one or more power sensors in a switching means 166 transmits data relating to the amount of energy that has been distributed to a particular mobile device 182. The data is transmitted as invoicing information to the cloud server 100 and is typically forwarded to a specific address in an associated network 120.

The embodiments disclosed in the detailed description are only examples of preferred embodiments and are not intended to restrict the scope of the present invention. The scope of the invention is only defined by the claims.

The invention claimed is:

1. A cloud server (100) adapted for controlling a group (142) of one or more electric distribution appliances (130, 134, 138), each electric distribution appliance (130, 134, 138) of said group being adapted for distributing electric power from a power mains (164) to a mobile device (182), each electric distribution appliance (130, 134, 138) of said group having a controller (168), a communication unit (178) adapted for communication with a cloud server (100), a user interface section (176) and a switching means (166), said user interface section (176) being adapted for generating a distribution request after receiving input from a user and adapted for forwarding said distribution request to said controller (168), said controller (168) being adapted to transfer said distribution request to said communication unit (178), said communication unit (178) being adapted for transferring said distribution request to a cloud server (100) and to receive a distribution decision from said cloud server (100) and to forward said distribution decision to said controller (168), said controller (168) being adapted to control the distribution of power carried out by said switching means (166) based on information transferred from said user interface section (176) and said distribution decision forwarded from said communication unit (178);

said cloud server (100) comprising
   a processor (104);
   a memory means (107) adapted for storing one or more rules regarding distribution of electricity in an electric distribution appliance (130, 134, 138) of the group (142) of one or more electric distribution appliances; and
   a master communication unit (106) being adapted for communication with each electric distribution appliance (130, 134, 138) of a group (142) of one or more electric distribution appliances;
   said master communication unit (106) being set up to receive a distribution request from an electric distribution appliance (130) of the group (142) of one or more electric distribution appliances and to forward the distribution to said processor (104);
   said processor (104) being set up to receive a distribution request from said master communication unit (106);
   said processor (104) being set up to access one or more rules stored in said memory means (107);
   said processor (104) being set up to prepare a distribution decision based upon said distribution request using said one or more rules;
   said processor (104) being set up to instruct said master communication unit (106) to forward said distribution decision to said electrical distribution appliance (130) of the group (142) of one or more electrical distribution appliances;
   said processor (104) being adapted for preparing a distribution decision in absence of a distribution request and in accordance with said one or more rules.

2. A cloud server (100) according to claim 1 wherein the processor (104) is adapted to save distribution requests relating to ongoing distributions in said memory means (107) and to delete distribution requests relating to terminated distributions from said memory means (107).

3. A cloud server (100) according to claim 1, wherein said master communication unit (106) is adapted for communication with an external network (120).

4. A cloud server (100) according to claim 1 wherein said master communication unit (106) is adapted for communication with the Internet (106) using mobile phone technology, including one or more of: GSM, 3G and 4G.

5. A cloud server (100) according to claim 3, wherein said master communication unit (106) is set up to receive information packages from each member of said group (142) of electric distribution appliances;
   said processor (104) being set up to forward such information packages to one or more specific addresses in said external network (120).

6. A cloud server (100) according to claim 5, wherein said information packages being received from each member (130, 134, 138) of said group (142) of electric distribution appliances that are being forwarded to one or more specific addresses in said external network (120) relate to invoicing information or status reports.

7. A cloud server (100) according to claim 1, wherein said master communication unit (106) is adapted for receiving information packages relating to updates of said rules from said external network (120), said master communication unit (106) being adapted for forwarding the information packages relating to updates of said rules to said processor (104), said processor (104) being adapted to updating the rules stored in said memory means (107) based on said information packages relating to updates of said rules.

8. A cloud server (100) according to claim 1, wherein said master communication unit (106) is adapted for communicating with electric distribution appliances (130, 134, 138) of said group (142) of one or more electric distribution appliances via a master appliance connected to said external network (120) which master appliance in turn is adapted for communicating with said electric distribution appliances (130, 134, 138) of said group (142) using Wireless technology.

9. A system (150) for distributing power from a power mains to one or more mobile devices (182), said system (150) comprising a) a group (142) consisting of one or more electric distribution appliances (130, 134, 138); and b) a cloud server (100) in accordance with claim 1, wherein each electric distribution appliance (130, 134, 138) of said group (142) being adapted for distributing electric power from a power mains to a mobile device (182), each electric distribution appliance (130, 134, 138) of said group (142) having a controller (168), a communication unit (178) adapted for wireless communication with said cloud server (100), a user interface section (176) and a switching means (166), said user interface section (176) being adapted for generating a distribution request after receiving input from a user and adapted for forwarding said distribution request to said controller (168), said controller (168) being adapted to transfer information relating to a distribution request to said communication unit (178), said communication unit (178) being adapted for transferring said information relating to a distribution request to the cloud server (100) and to receive a distribution decision from said cloud server (100) and to forward said distribution decision to said controller (168), said controller (168) being adapted to control the distribution of power carried out by said switching means (166) based on information transferred from said user interface section (176) and said distribution decision forwarded from said communication unit (178).

10. A method for distributing power, said method being implemented in a system (150) in accordance with claim 9, said system (150) comprising a cloud server (100) and a group (142) of one or more electric distribution appliances (130, 134, 138), the method comprising the steps of:
  d) generating a distribution decision in the processor (104) of the cloud server (100) taking the rules stored in the memory means (107) of the cloud server (100) into account, said distribution decision relating to a specific distribution of power in a specific electric distribution appliance (130) of the group (142) of electric distribution appliances, wherein the distribution decision may relate to initiation, adjustment or termination of a power distribution event;
  e) transferring the distribution decision generated in step d) via the master communication unit (106) of the cloud server (100) and the communication unit (178) of the specific electric distribution appliance (130) to the controller (168) of the specific electric distribution appliance (130); and
  f) generating, in the controller (168) of the specific electric distribution appliance (130), control signals in accordance with the distribution decision transferred in step e), and forwarding said control signals to the switching means (166) of the specific electric distribution appliance (130), thereby implementing the distribution decision.

11. A method for distributing power to one or more mobile devices (182), such as an electric vehicle, said method being in accordance with the method of claim 10 and where the following steps are carried out before step d) of claim 10:
  a) receiving input from a user at a user interface section (176) of a specific electric distribution appliance (130) of the group (142) of one or more electric distribution appliances regarding distribution of power to a mobile device (182) from the specific electric distribution appliance (130);
  b) generating a distribution request based upon the input received in step a);
  c) transferring the distribution request generated in step b) via the controller (168) and communication unit (178) of the specific electric distribution appliance (130) and the master communication unit (106) of the cloud server (100) to the processor (104) of the cloud server (100).

12. A method for distributing power in accordance with claim 10, wherein
  i) distribution decisions relating to on-going power distribution events are stored in said memory means (107);
  ii) distribution decisions relating to terminated power distribution events are deleted from said memory means (107); and
  iii) distribution decisions stored in said memory means (107) as well as said rules stored in said memory means (107) are considered when generating new distribution decisions.

13. A method for distributing power in accordance with claim 12, wherein invoicing data is forwarded from a specific electrical distribution appliance (130) via the cloud server (100) to a specific address in said external network (120) when a power distribution event at that specific electrical distribution appliance (130) has been terminated.

14. A method for distributing power in accordance with claim 11, wherein said input received in step a) of claim 11 is at least one action selected from the group of:
  1) presenting an RFID tag before an RFID reading means of the interface section (176) of an electrical distribution appliance (130), said presenting generating an input regarding distribution of power to a mobile device (182) from the specific electric distribution appliance (130);
  2) presenting a wireless device before a wireless means of the interface section (176) of an electrical distribution appliance (130) said presenting generating an input regarding distribution of power to a mobile device (182) from the specific electric distribution appliance (130); and
  3) calling up or sending an SMS text message to a specific phone number over a mobile phone network from a mobile appliance containing a SIM card registered by said system (150), said calling or sending resulting in transmission of a signal to said system (150) from said mobile network, which generates an input regarding distribution of power to a mobile device (182) from the specific electric distribution appliance (130).

15. A method for distributing power in accordance with claim 14, wherein said input is selected from the group of:
  an instruction to initiate distribution of electrical power; and
  an instruction to terminate distribution of electrical power.

16. The cloud server in accordance with claim 1, wherein the mobile device (182) is an electric vehicle.

17. The system in accordance with claim 9, wherein the mobile device (182) is an electric vehicle.

18. The method in accordance with claim 11, wherein the mobile device (182) is an electric vehicle.

\* \* \* \* \*